Patented Feb. 27, 1951

2,543,733

UNITED STATES PATENT OFFICE 2,543,733

AMINO-PHENYLMERCURY SULFATE AND AQUEOUS SOLUTIONS THEREOF

Frank J. Sowa, Cranford, and Arthur Schwerdle, New Providence, N. J.; said Schwerdle assignor to said Sowa No Drawing. Application May 15, 1946, Serial No. 670,017

8 Claims. (Cl. 167—30)

This invention relates to methods of producing amino phenylmercury compounds and to compositions for use as germicides, fungicides and the like wherein the active ingredient is an amino-phenylmercury compound.

It is known that solutions containing an amino-phenylmercury acetate are highly efficient as a germicide and fungicide, particularly for application to materials such as textiles, paper, leather, and the like. Thus for example para-amino-phenylmercury acetate is known and used as a fungicide. However, such compounds are relatively expensive to produce and are not very soluble in aqueous solutions unless various solubilizing agents are added, such as those described in Sowa Patents Nos. 2,411,815 and 2,423,262. It has therefore been necessary heretofore for the manufacturer to form special solutions of such concentration that they can be economically stored and shipped or to rely upon the user to mix solubilizing agents with the amino-phenylmercury compound when adding it to a bath, spray or other solution.

In accordance with the present invention new methods of producing amino-phenylmercury compounds are provided which are easy and economical to carry out and which result directly in the formation of solutions containing a known amount of the amino-phenylmercury compound without isolating the reaction products or adding any further solubilizing agents thereto.

These results are attained by carrying out direct reactions between mercury, sulfuric acid and aniline or by reactions between aniline and mercuric sulfate in the presence of sulfuric acid. Neutralization of the reaction mixture with ammonium hydroxide sufficient to render the solution suitable for most industrial purposes results in the formation of a solution which need not be further treated before addition to aqueous solutions or baths and which contains a predetermined amount of amino-phenylmercury compound. Moreover, the amino-phenylmercury acid sulfate produced can be readily converted into other amino-phenylmercury compounds or salts by convenient reactions and these reactions in turn can be carried out without isolating any intermediate products.

The principal object of the present invention is to provide a new and improved process of producing amino-phenylamino compounds.

A further object of the invention is to provide a process whereby solutions comprising aminophenylmercury acid salts may be produced from mercury, sulfuric acid and aniline without the isolation of any intermediate products.

Another object of our invention is to provide novel compositions for germicidal, bactericidal and fungicidal purposes comprising an aminophenylmercuric compound in a predominantly aqueous solution.

Still further objects and advantages of the invention will in part appear and in part be pointed out in the course of the following detailed description of several embodiments of the invention in which typical examples are cited for the purpose of indicating the nature of the invention and are not to be construed as in any way limiting the scope thereof.

The reactions by which amino-phenylmercury compounds are produced can be carried out most readily by dissolving metallic mercury in sulfuric acid and mixing the resulting solution with aniline. This renders it possible to employ inexpensive reactants which are readily obtainable on the market and of known purity. However, similar results can be obtained by reacting aniline with a solution containing mercuric sulfate and sulfuric acid.

The reaction takes place quickly and at relatively low temperatures and does not require the use of special or expensive equipment. The amino-phenylmercury acid sulfate produced can be converted into the corresponding hydroxide by neutralizing the reaction solution with an excess of alkali, whereas other compounds can be produced by reactions between amino-phenylmercury hydroxide and various organic and inorganic acids. If desired these products may be readily isolated from the solutions in which they are produced by crystallization or otherwise and are obtained in a substantially pure form. However, when they are to be used in the form of a solution the reaction solution itself may be shipped as a concentrated form of the product and thereafter diluted as desired for any particular application without isolating the aminophenylmercury compound.

In order to illustrate the invention still further the following examples of typical procedure, proportions and reactions are cited:

Example I 80 grams of concentrated sulfuric acid and 40 grams of mercury were boiled together for approximately one and one-half hours. During the first hour sulfur dioxide was evolved, and at the end of this step the mercury was completely dissolved. The solution was diluted with water to 500 cc., and it then turned slightly yellow in color. An additional trace of sulfuric acid was added until a clear color was obtained. The solution was then filtered and approximately 1 gram of an insoluble white substance was removed. This substance was insoluble in dilute sulfuric acid and was thought to be mercurous sulfate.

In the next step of this embodiment of the invention, 19 grams (0.2 mole) of aniline were dissolved in 300 cc. of hot water (approximately 80° C.) to which had been added 20 grams of concentrated sulfuric acid, and the resulting solution was then added to the mercuric sulfate-sulfuric acid solution obtained in the first step above. A heavy crystalline precipitate formed almost immediately and was followed by a slower, gradual precipitate. This precipitate consists of amino-phenylmercuric acid sulfate and has been found to have the composition represented by the structural formula

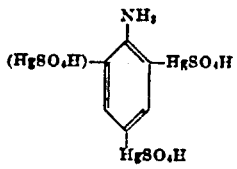

This product may be recovered in a substantially pure form by filtering it from the acid solution if desired. However, in the preferred practice of the invention the salt is not isolated, but instead the excess sulfuric acid is neutralized and the solution is made ammoniacal by the addition of 140 cc. of ammonium hydroxide. Approximately 100 cc. of ammonium hydroxide was needed to neutralize the solution, the excess being added to increase the solubility of the phenylmercury salt in accordance with the teaching of the patent of Frank J. Sowa No. 2,411,815 which discloses that the solubility of organic mercury salts in aqueous solutions is greatly increased if ammonium hydroxide and an ammonium salt are present in the solution. The amino-phenylmercury acid sulfate was in complete solution after approximately fifteen minutes of vigorous stirring, and it was then permitted to stand for approximately 40 hours. The solution was subsequently diluted to 1 liter and filtered to remove any undissolved or precipitated material.

The solution obtained by means of the foregoing process may be applied in any desired way to a wide variety of materials such for example as textiles, yarn, fibers, paper, leather, plastics or may be used as an agricultural spray or the like to render materials bacteriostatic, fungistatic or mildew resistant. For example, 100 grams of said solution may be added to each gallon of water in a textile treating bath, and cotton fabric may be passed through the bath and then run wet through squeeze rolls adjusted to leave an amount of liquid in the fabric equal to the dry weight thereof. The fabric is then said to have "100% pick up" and may thereafter be dried in any suitable way, for example on calendar rolls or a tenter frame running through an oven. Instead of applying the solution by itself to the fabric, it may be used in conjunction with any of the usual textile finishes such as starch finishes, water-repellent wax emulsion finishes or the like.

The above described process has substantial advantages in the practice of the present invention. It results in the production of a solution of an amino-phenylmercuric acid salt suitable for use as described without the necessity for the isolation of any intermediate product. It is more convenient and more economical than any process heretofore available in the art.

Example II 60 grams of mercuric sulfate (HgSO$_4$) were dissolved in 500 cc. of water containing 35 cc. of concentrated sulfuric acid. 19 grams of aniline were then dissolved in 300 cc. of water containing 12 cc. of sulfuric acid by heating the mixture. The two solutions were then mixed and stirred whereupon a white crystalline precipitate of amino-phenylmercury acid sulfate was produced.

Example III 40 grams of mercuric oxide were dissolved in 35 cc. of concentrated sulfuric acid and 500 cc. of water. 19 grams of aniline dissolved in 300 cc. of water containing 12 cc. of sulfuric acid were then added to the first solution whereupon the amino-phenylmercuric acid sulfate precipitated.

Example IV

The solutions from which the amino-phenylmercury acid sulfate were precipitated in Examples I and II were made alkaline with caustic soda and then heated to boiling for 5 minutes whereupon amino-phenylmercury hydroxide was formed. This may be isolated by concentrating the solution and washing with water or it may be converted directly into the salts of organic or inorganic acids. In this way it has been possible to produce the amino-phenylmercury salts of boric, nitric, acetic, gluconic, butyric, lactic and malic acids, but many other salts and compounds of this type may be produced.

Example V

A solution was prepared by dissolving 79.6 grams of amino-phenylmercuric acetate in 214 grams of triethanolamine and 706.4 grams of water. The resulting solution is clear, and it appears that the amino-phenylmercuric acetate and triethanolamine actually combine to form a new product. The reaction appears to be similar to the corresponding reaction between phenylmercuric acetate and triethanolamine disclosed in Sowa copending application Serial No. 500,449, filed August 28, 1943, now Patent No. 2,423,262 and may be represented by the following equation:

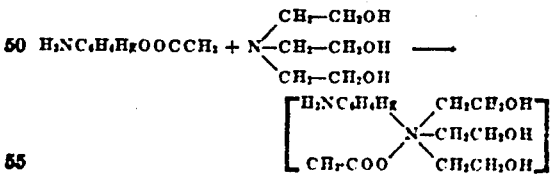

A solution of increased stability is obtained by substituting 15 grams of lactic acid in place of 25 grams of water in the above example. Either of these solutions is admirably suited for application to fabrics as described above in connection with Example I. They may be applied to paper, as for example by addition to the feed water in the beater of a paper making process to prevent the formation of slime. They are of value in laundering processes to prevent mildew, and they may be added to soaps and many cosmetic creams and lotions as antiseptics and fungicides. They may also be used as agricultural sprays and for many other bactericidal and fungicidal purposes. The concentrations in which they are applied will depend largely upon their purpose and conditions of use, but in general 500 cc. of the foregoing solution as prepared above is added to every 25 to 100 gallons of water.

Example VI

A solution was prepared by dissolving 35 grams of amino-phenylmercuric acetate in 924 grams of water containing 28.5 grams of ammonium sulfate and 12.5 grams of ammonium hydroxide. In this example the ammonium hydroxide and ammonium salt are for the purpose of increasing the solubility of the mercury salt. This solution may be used for substantially the same purposes and in substantially all the same ways as described above in connection with Examples I and IV. It may be used in any desired concentration as described above in connection with Examples I and IV.

Example VII

A solution was prepared by dissolving 30 grams of amino-phenylmercuric acetate in 120 grams of lactic acid, and 900 grams of hot water (60° C.) were then added. The application of this solution is substantially the same as for Examples I, V and VI described above and in corresponding concentrations. The foregoing examples are typical of preferred methods of producing amino-phenylmercury compounds in accordance with the present invention, and illustrate typical uses and applications of such compounds together with new fungicidal compositions embodying amino-phenylmercury compounds as an active constituent. However, it will be apparent that many changes may be made in the precise operations and procedure employed and in the proportions of the reactants used. For these reasons it should be understood that the specific examples cited are intended to be illustrative only and are not intended to limit the scope of the invention.

We claim:

1. The method of preparing an amino-phenylmercury acid sulphate comprising contacting mercuric sulfate with aniline in an acidic aqueous solution containing sulfuric acid.

2. The method of preparing an amino-phenylmercury acid sulphate comprising reacting an acidic aqueous solution of sulfuric acid and aniline with an aqueous solution comprising mercuric sulfate and sulfuric acid.

3. The method of preparing an amino-phenylmercury acid sulphate comprising dissolving mercury in sulfuric acid, and mixing the resulting solution with an acidic aqueous solution of sulfuric acid and aniline.

4. The method comprising dissolving mercury in sulfuric acid, mixing the resulting solution with an acidic aqueous solution containing sulfuric acid and aniline in substantially molar proportions with respect to the mercury, and then neutralizing said solution.

5. The method comprising dissolving mercury in sulfuric acid, mixing the resulting solution with an acidic aqueous solution containing sulfuric acid and aniline in substantially molar proportions with respect to the mercury, and then adding ammonium hydroxide to said solution in excess of the amount necessary for neutralization thereof.

6. The method of preparing an amino-phenylmercuric acid sulfate comprising boiling mercury in concentrated sulfuric acid until it is completely dissolved, diluting said solution with water, dissolving aniline in dilute sulfuric acid in substantially molar proportion with respect to the mercury, and mixing said solutions.

7. The method of preparing an aqueous solution comprising boiling mercury in concentrated sulfuric acid until it is completely dissolved, diluting said solution with water, dissolving aniline in dilute sulfuric acid in substantially molar proportion with respect to the mercury, mixing said solutions and then adding ammonium hydroxide to the resulting solution in excess of the amount necessary for neutralization thereof.

8. Amino-phenylmercuric acid sulfate having the composition represented by the formula

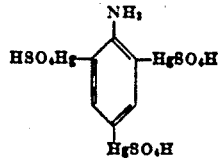

FRANK J. SOWA.
ARTHUR SCHWERDLE.

REFERENCES CITED

The following references are of record in the file of this patent:

UNITED STATES PATENTS

| Number | Name | Date |
| --- | --- | --- |
| 1,525,078 | Kropp | Feb. 3, 1925 |
| 1,604,778 | Klager | Oct. 26, 1926 |
| 1,787,630 | Kharasch | Jan. 6, 1931 |
| 1,862,896 | Kharasch | June 14, 1932 |
| 2,044,959 | Tisdale | June 23, 1936 |
| 2,167,966 | Anderson | Aug. 1, 1939 |
| 2,169,736 | Kern | Aug. 15, 1939 |
| 2,250,345 | Allison | July 22, 1941 |
| 2,353,312 | Kobe et al. | July 11, 1944 |
| 2,376,291 | Sowa | May 15, 1945 |
| 2,392,801 | Peterson | June 8, 1946 |
| 2,411,815 | Sowa | Nov. 26, 1946 |

FOREIGN PATENTS

| Number | Country | Date |
| --- | --- | --- |
| 22,336 1906 | Great Britain | May 23, 1907 |
| 242,669 | Great Britain | Feb. 11, 1926 |

OTHER REFERENCES

Rupp et al.: "Archiv. der Pharmazie," vol. 265 (1927), pages 323–331.

Pesci: "Gazzetta Chimica Italiana," vol. 22, pt. 1 (1892), page 380.

Pesci: "Gazzetta Chimica Italiana," vol. 28, pt. 2 (1898), page 466.

Raffo et al: "Gazzetta Chimica Italiana," vol. 44, pt. 1 (1914), pages 109–112.

Vecchiotti: "Gazzetta Chimica Italiana," vol. 44, pt. 2 (1914), pages 34–38.